United States Patent [19]
Mencacci

[11] 4,196,225
[45] Apr. 1, 1980

[54] CONTINUOUS PRESSURE COOKER AND COOLER WITH CONTROLLED LIQUID FLOW

[75] Inventor: Samuel A. Mencacci, San Jose, Calif.
[73] Assignee: FMC Corporation, San Jose, Calif.
[21] Appl. No.: 897,475
[22] Filed: Apr. 18, 1978

Related U.S. Application Data

[60] Division of Ser. No. 781,405, is a continuation-in-part of Ser. No. 767,277, Feb. 10, 1977, abandoned.

[51] Int. Cl.$^2$ .............................................. A23C 3/00
[52] U.S. Cl. .................................... 426/523; 53/127; 426/233; 426/407; 426/412
[58] Field of Search ............. 426/523, 407, 412, 232, 426/233; 53/127; 99/330, 359, 360, 361, 362, 363, 364, 366, 367, 368, 369, 370, 371, 403, 404, 409

[56] References Cited

U.S. PATENT DOCUMENTS

| 539,124 | 5/1895 | Empson | 99/366 |
|---|---|---|---|
| 915,765 | 3/1909 | Harders | 99/361 |
| 2,134,817 | 11/1938 | Gerber | 99/367 |
| 3,340,791 | 9/1967 | Mencacci et al. | 99/367 |
| 3,511,167 | 5/1970 | Fritzberg et al. | 99/370 |

FOREIGN PATENT DOCUMENTS 744791  1/1944  Fed. Rep. of Germany ............. 99/357

Primary Examiner—S. Leon Bashore
Assistant Examiner—George C. Yeung
Attorney, Agent, or Firm—A. J. Moore; C. E. Tripp

[57] ABSTRACT

Method for continuously processing filled containers with liquid heat treatment mediums maintained under superatmospheric pressure by an overriding air pressure. A minimum of liquid is used during processing with the liquid level being maintained above the containers at all times. The liquid is controllably circulated through container filled tunnels defined within carts, from one end of the tunnel to the other, to assure equal heat treatment of all containers in the batch of containers in each tunnel. The carts may either be non-agitating or agitating carts. One embodiment of the continuous pressure cooker and cooler includes a pressure vessel having two pressure locks to provide a pressure cooking chamber with high pressure cooling being performed in a mini-cooler defined by the outlet pressure lock followed by additional atmospheric cooling. Another embodiment of the invention comprises three pressure lock means to positively divide the pressure vessel into cooking and cooling chambers; and a third embodiment substitutes a plurality of baffles for the intermediate pressure lock thereby effectively dividing the pressure vessel into a cooking chamber and cooling chamber.

12 Claims, 22 Drawing Figures

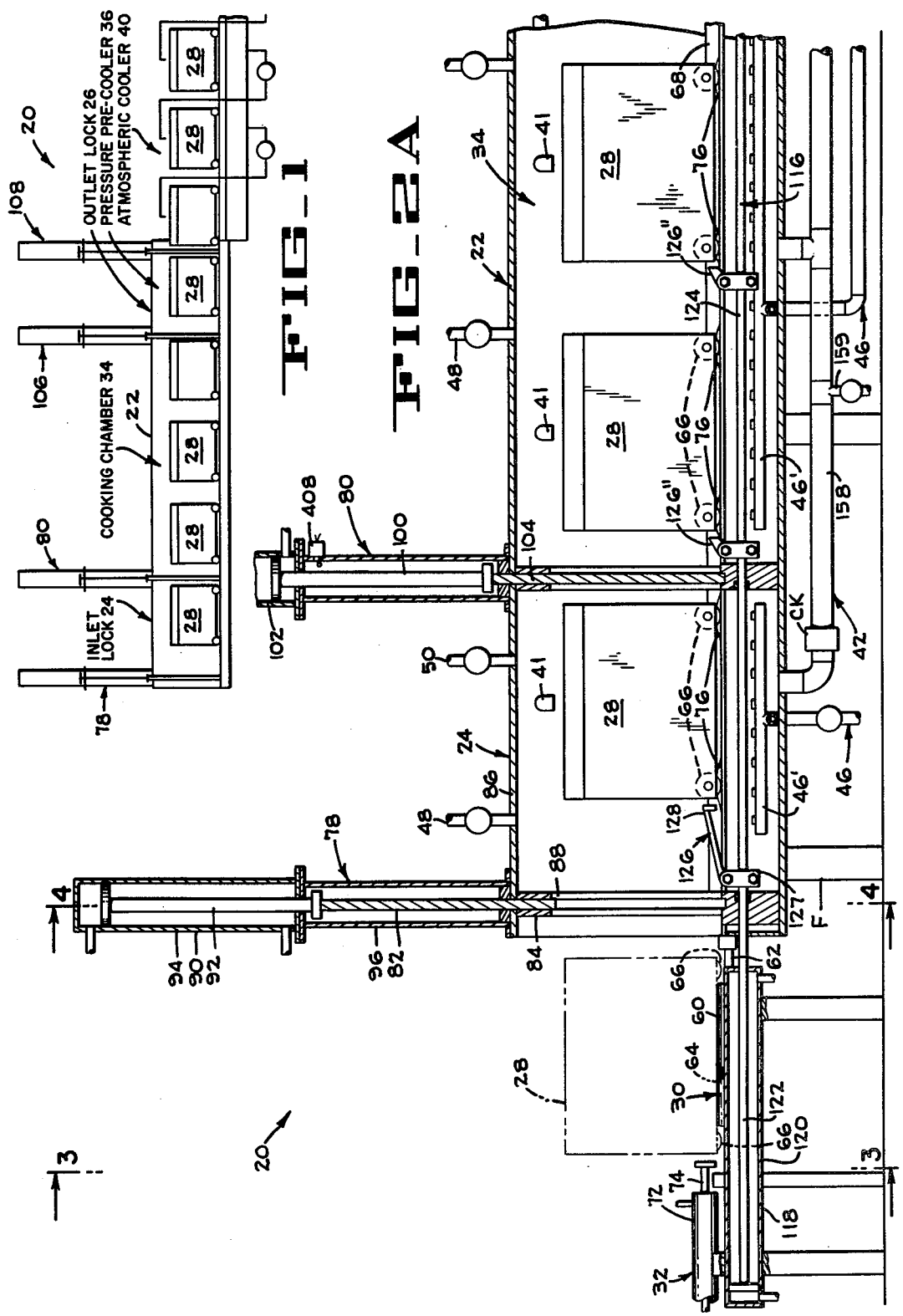

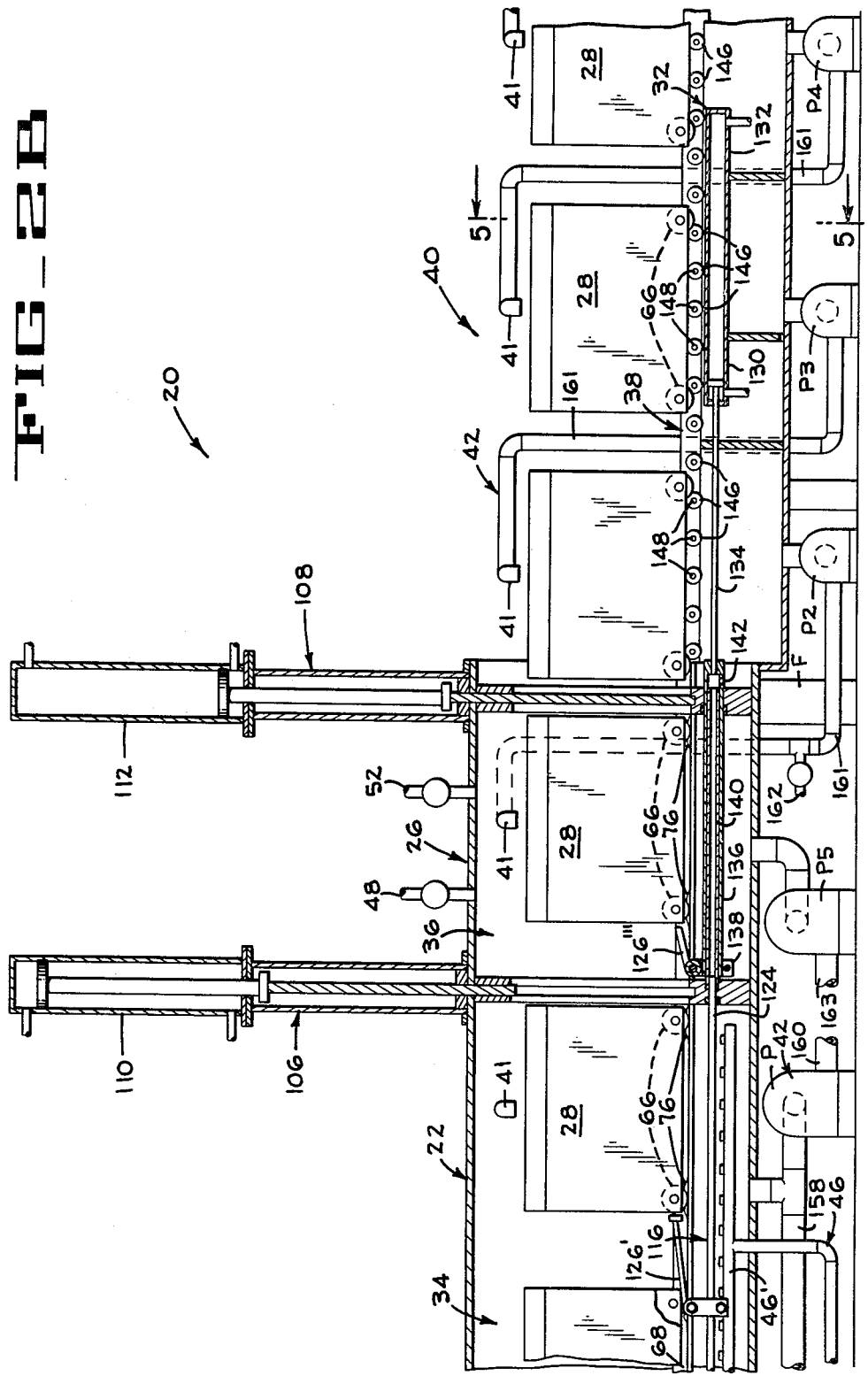

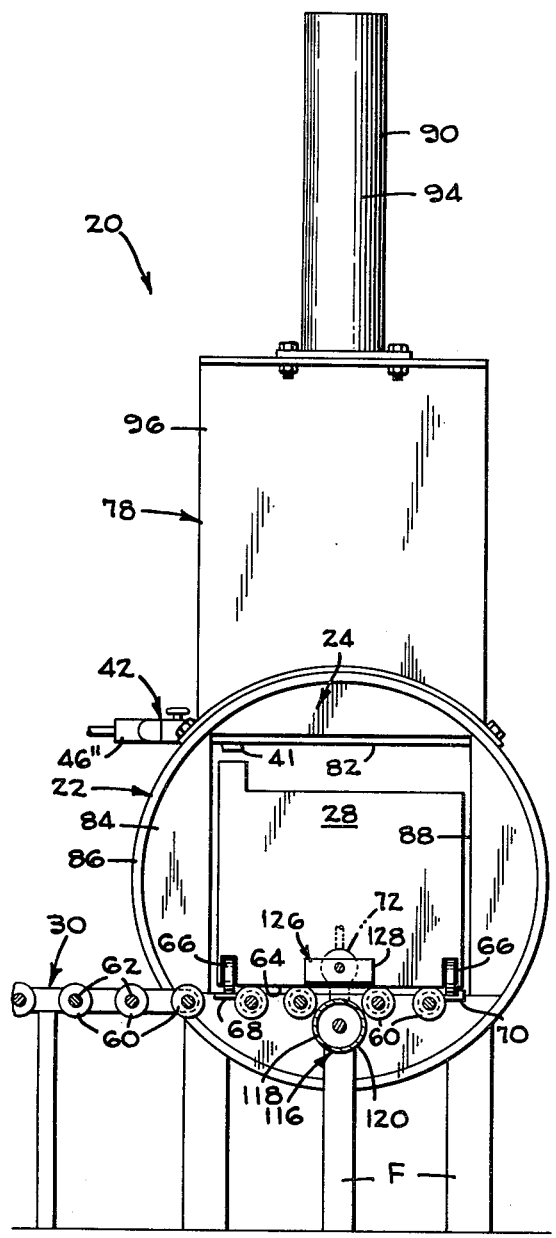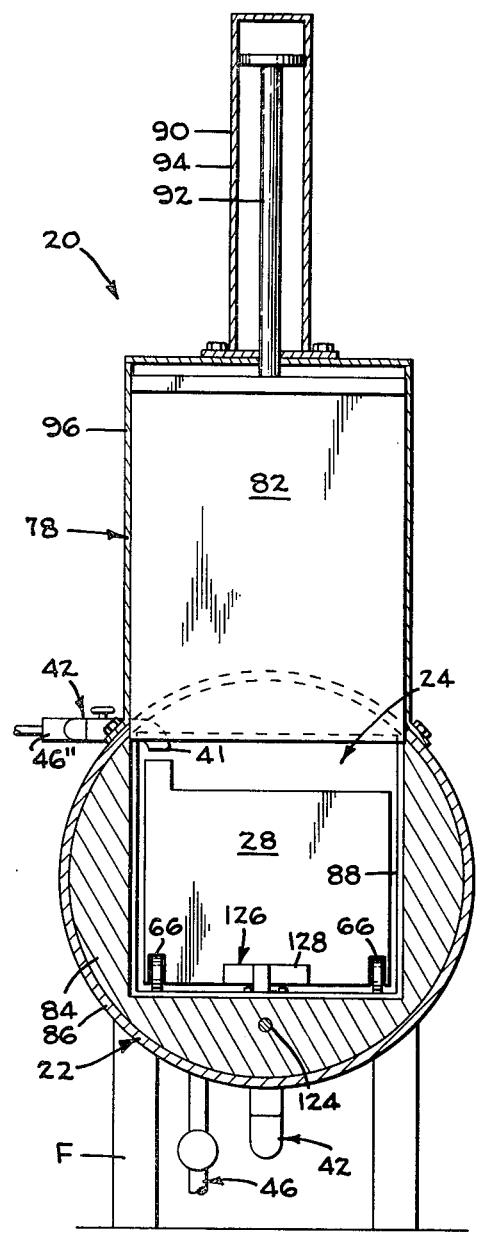

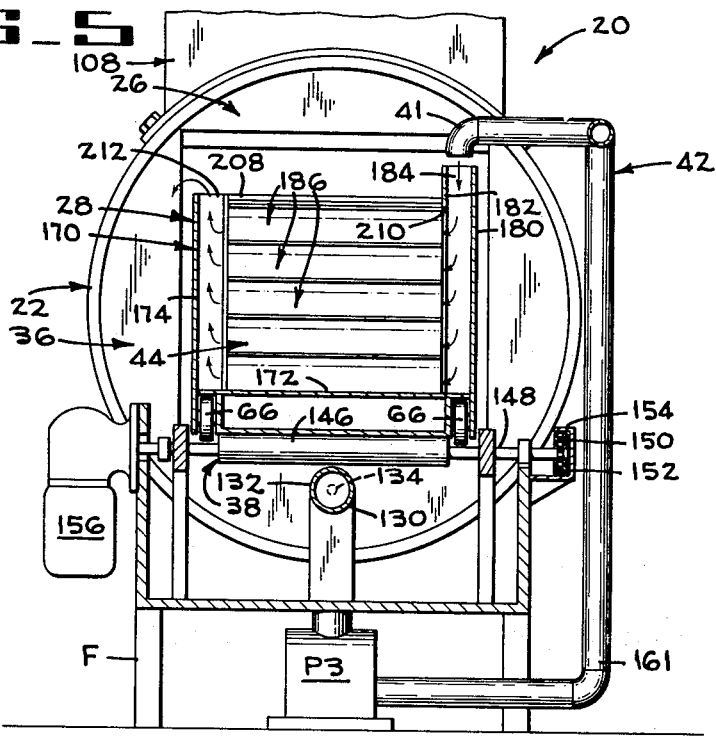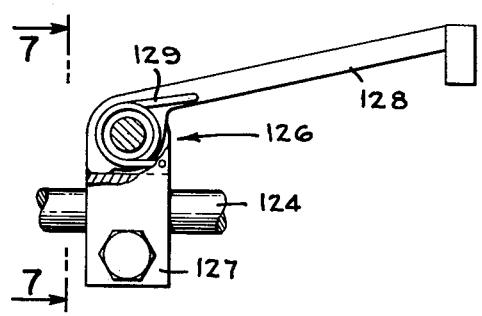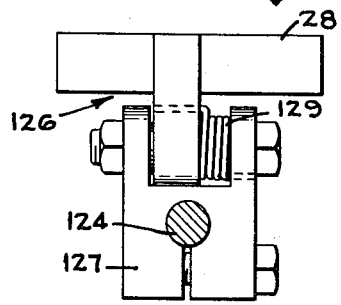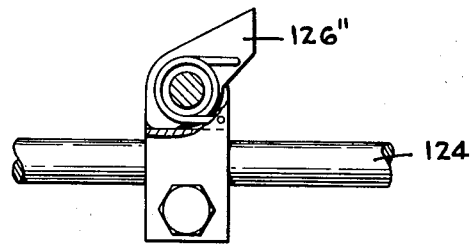

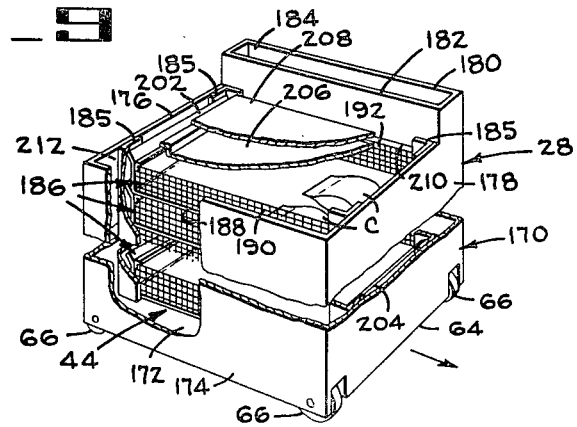
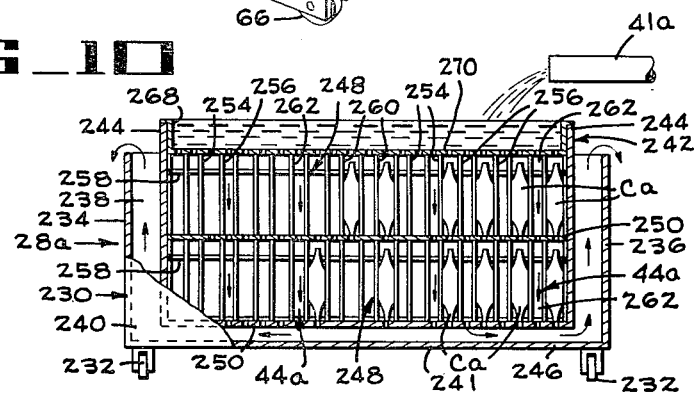
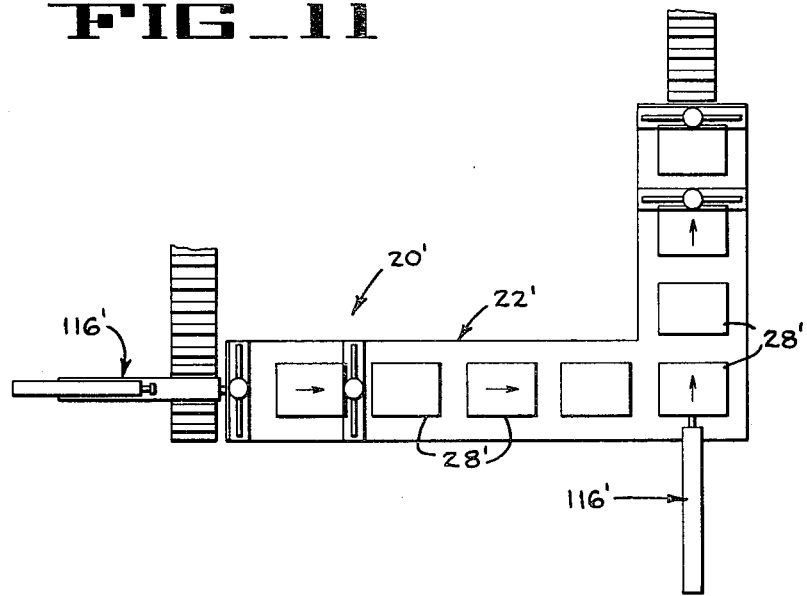

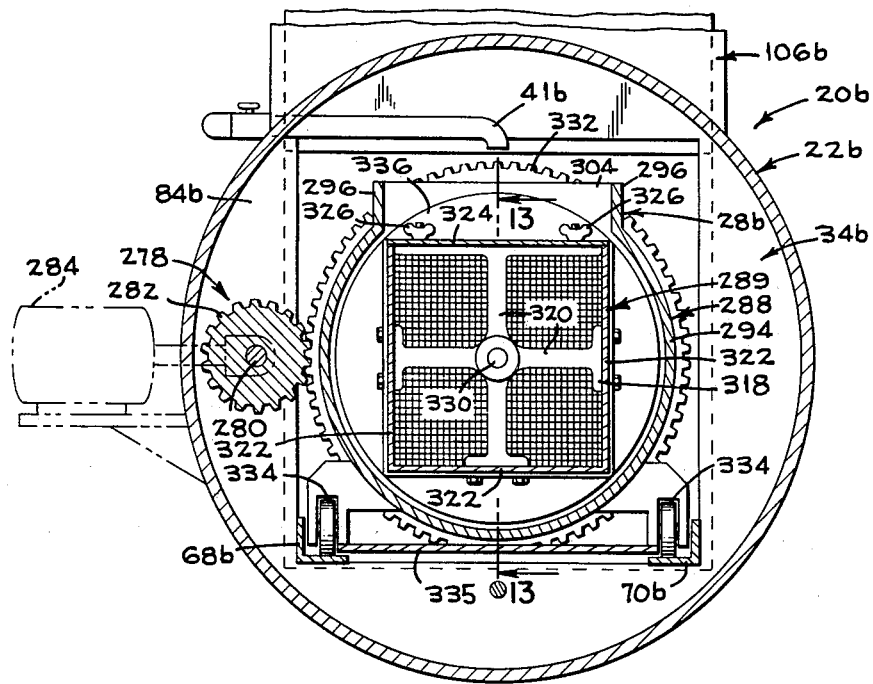

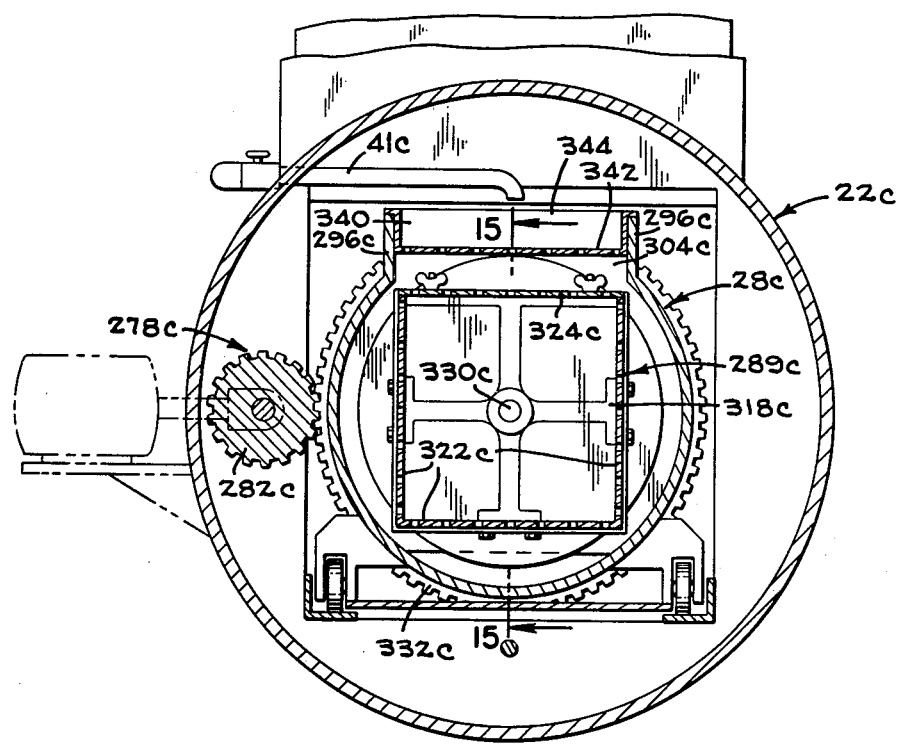
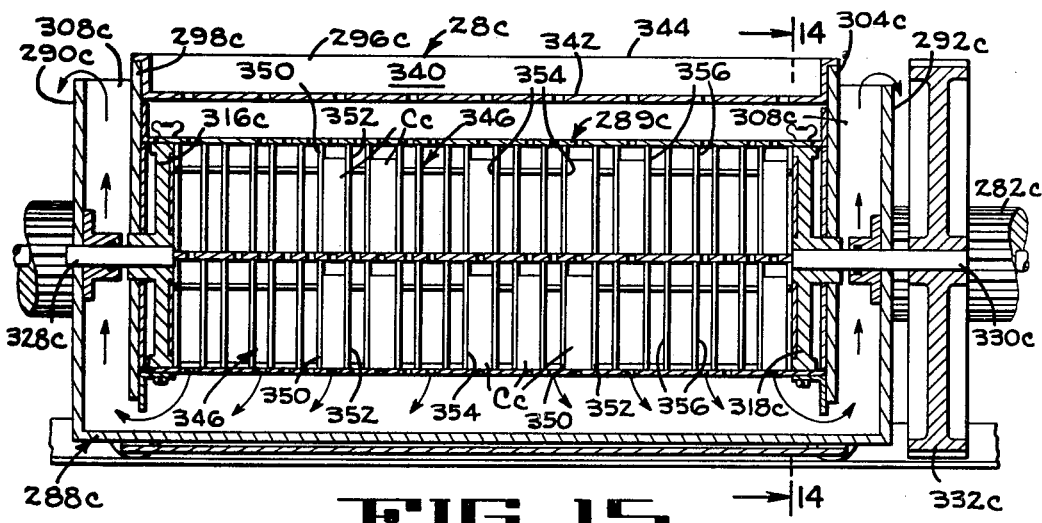

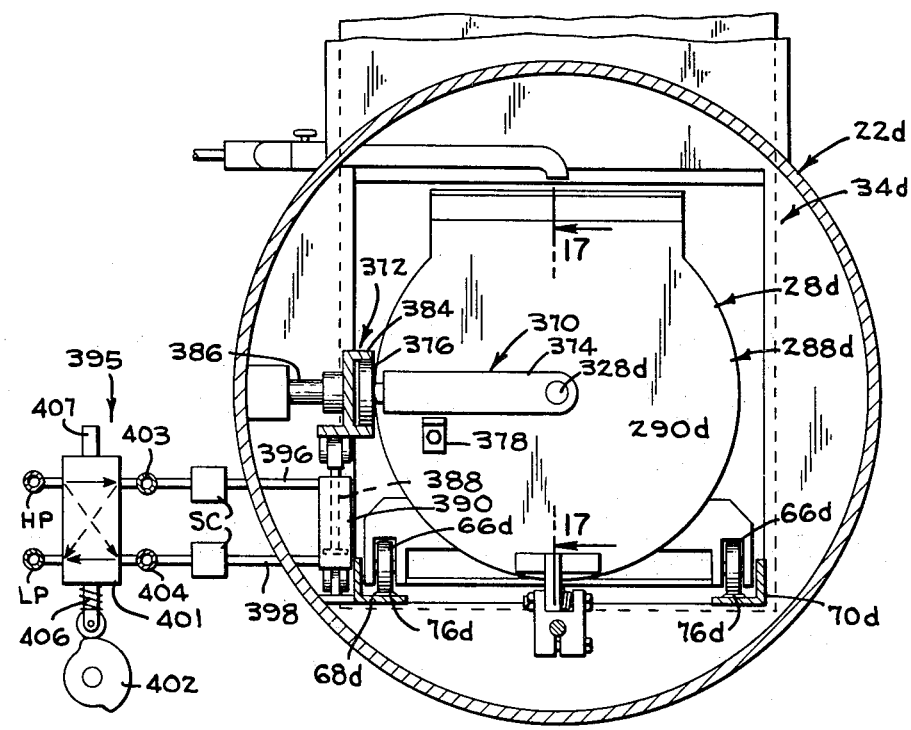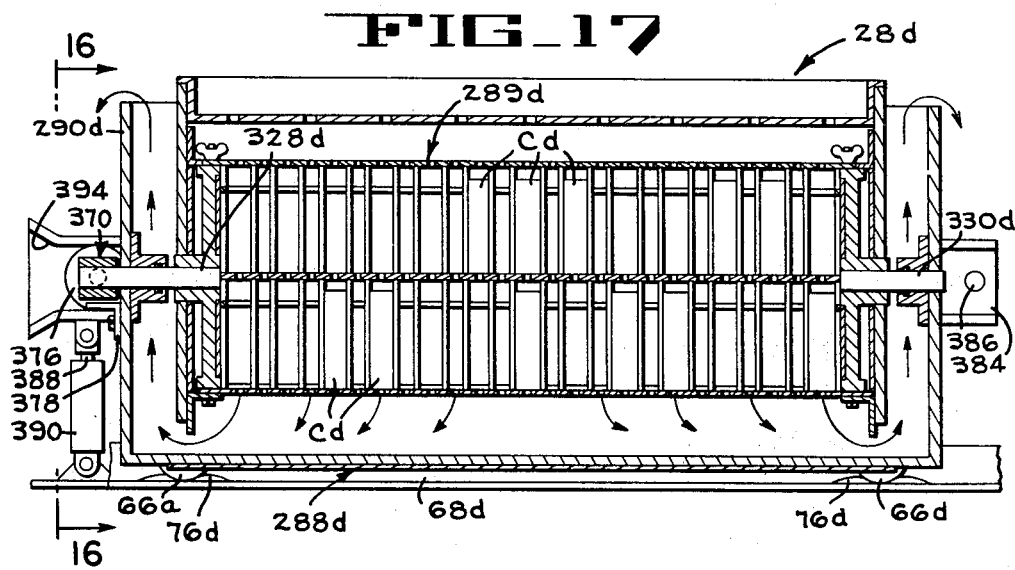

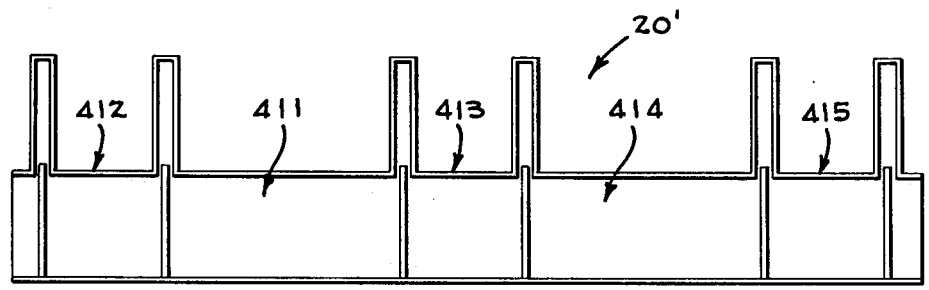
FIG_18
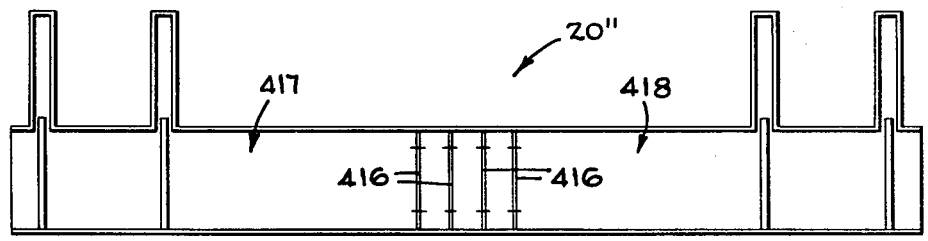
FIG_19

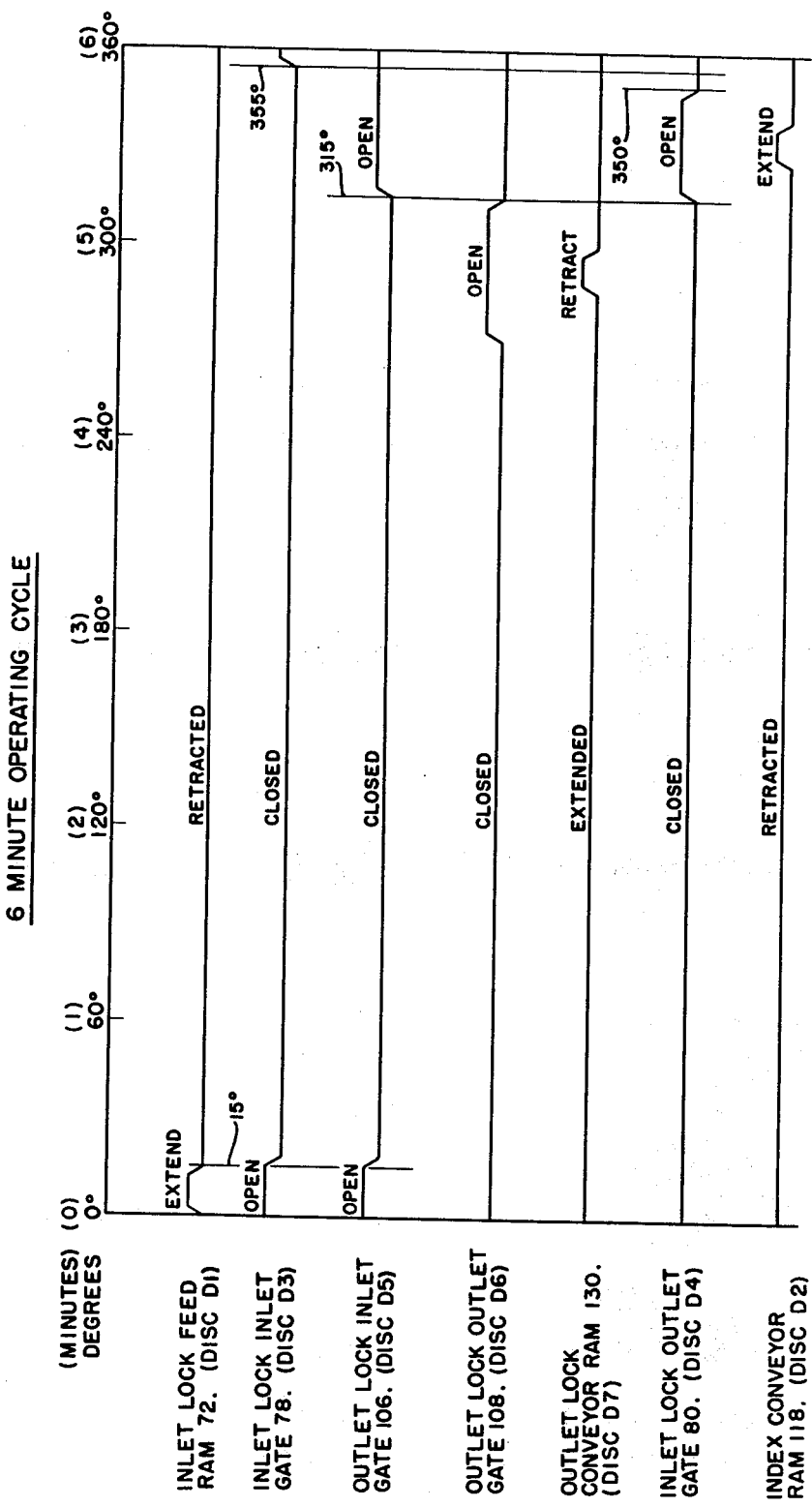

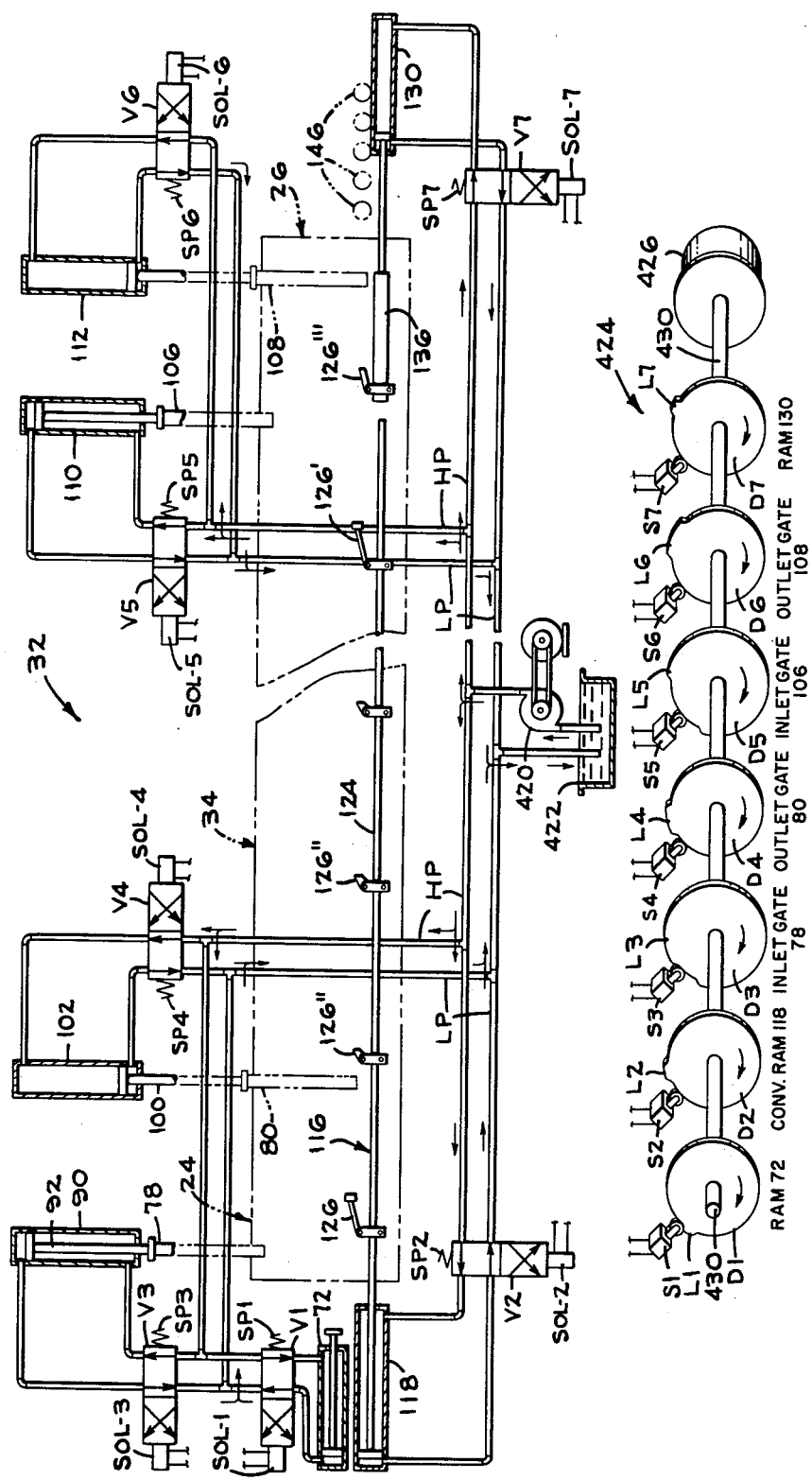

CONTINUOUS PRESSURE COOKER AND COOLER WITH CONTROLLED LIQUID FLOW

This is a division, of application Ser. No. 781,405 filed Mar. 25, 1977 which is a continuation-in-part of application Ser. No. 767,277 filed Feb. 10, 1977, now abandoned.

CROSS REFERENCE TO RELATED APPLICATIONS

This application pertains to the retort system and method disclosed in the Mencacci et al U.S. Pat. No. 4,003,302 issued on Jan. 18, 1977; and also relates to Mencacci application Ser. No. 751,923 which was filed on Dec. 16, 1976.

BACKGROUND OF THE INVENTION

1. Field of the Invention

This invention pertains to container cooking and cooling systems and more particularly relates to a continuous method for cooking and cooling containers with a controlled flow of liquid under superatmospheric pressure while using a minimum amount of heat treatment liquid and when processing the containers either in a still cook or an agitating cook.

2. Description of the Prior Art

Batch type retort systems for cooking and cooling containers such as cans, jars, pouches and trays in water are well known in the art. In order to prevent damage to the containers due to pressure within the containers tending to exceed the pressure externally of the containers, an overriding air pressure is applied over the liquid in these prior art devices.

Although the early types of retorts using heat treatment liquids had problems of uniformly heating each container in the batches of containers since the liquid flow past the outer containers was usually greater than the flow past the containers in the center of the batch, this problem of uniform heat treatment has been solved by the method disclosed in the above mention Mencacci et al U.S. Pat. No. 4,003,302 of which I am a co-inventor. In the Mencacci et al device, containers are loaded into a tunnel and the loaded tunnel is enclosed within a retort. Heat treatment liquid is then circulated past the containers from one end to and through the other end of the tunnel. The liquid is thereafter reheated and recirculated. In order to assure that the uppermost containers in the tunnel are completely immersed in flowing water, the water in the Mencacci et al retort, both within the externally of the tunnel, is maintained at a level above the tunnel. Thus, when changing from the cooking to the cooling cycle the large amount of hot water externally of the tunnel must either be stored in a very large and expensive pressure storage tank, or must be drained and thereafter cold water must be reheated for the next batch resulting in a substantial loss in energy required for heating.

U.S. Pat. No. 3,776,257 to Piegza which issued on Dec. 4, 1973, discloses a high pressure retort with flat walls which separate an article and liquid filled treatment chamber from the outer curved areas of the retort thereby reducing the amount of liquid processing medium required. A gas pressure is applied to the external surfaces of the flat walls to prevent pressure induced bowing of the flat walls.

U.S. Pat. No. 3,389,788 which issued to S. A. Mencacci on June 25, 1968, and U.S. Pat. No. 3,528,827 which issued to R. E. Leslie on Sept. 15, 1970 both disclose pocketed rotors associated with reel and spiral type cookers or coolers which may serve either as rotary pressure preheaters or pre-coolers.

SUMMARY OF THE INVENTION

The preferred embodiment of the continuous pressure cooker and cooler of the present invention includes a pressure vessel having an inlet and an outlet pressure lock. Carts, each including means defining a tunnel filled with the containers to be processed, are moved through the inlet lock into a processing chamber and are maintained at superatmospheric pressure by high pressure air or a steam-air mixture while in the processing chamber. While in the processing chamber and within the inlet pressure lock, the carts are filled with a heat treatment liquid, hereinafter referred to as hot water, to a level above the level of the uppermost containers. The hot water is circulated through the tunnel from one end to the other and overflows from the cart into a shallow pool in the bottom of the pressure vessel. This hot water is then reheated and recirculated through the tunnel in the cart, as the cart is progressively advanced toward the outlet pressure lock and until the product within the containers is sterilized and cooked the desired amount. The cart is then advanced into the outlet pressure lock which serves as a pressure mini-cooler at which time a cooling liquid, hereinafter referred to as cold water, is circulated through the tunnel until the vapor pressure within the containers is reduced to a pressure approaching or below atmospheric pressure by condensation of the steam within the containers. The cart is then moved out of the pressure vessel into the atmosphere for processing by an atmospheric cooler at which time cooling is continued by directing cold water through the tunnels until the product itself is cooled below the boiling point of water at atmospheric pressure thus completing the processing cycle.

The carts used for supporting the containers and controlling the flow of liquid therepast may be either of a non-agitating or an agitating type depending upon the type of food product being processed.

A second embodiment of the continuous pressure cooker and cooler includes a third pressure lock for positively dividing the pressure vessel into a pressure cooking chamber and a pressure cooling chamber; while a third embodiment substitutes a plurality of baffles for the third pressure lock thereby effectively dividing the vessel into pressure cooking and cooling chambers.

It is therefore an object of the present invention to provide a superatmospheric method for continuously processing food filled containers with a controlled flow of heat treatment liquids past the containers to assure equal processing of all containers, and while using a minimum of heat processing liquids.

Another object is to provide a method of agitating the containers while they are being processed.

BRIEF DESCRIPTION OF THE DRAWINGS

FIG. 1 is a diagrammatic elevation of a first embodiment of the pressure cooker and cooler of the present invention.

FIGS. 2A and 2B when placed in end-to-end relationship diagrammatically illustrate the first embodiment of the pressure cooker and cooler of the present invention at a larger scale and in vertical central section.

FIG. 3 is an enlarged transverse section taken along lines 3—3 of FIG. 2A illustrating one of the carts after it has been moved into the inlet pressure lock.

FIG. 4 is a transverse section taken along lines 4—4 of FIG. 2A through one of the gates of the pressure locks with the gate being open.

FIG. 5 is a transverse section taken along lines 5—5 of FIG. 2B illustrating certain components of the atmospheric cooler at the discharge end of the apparatus.

FIG. 6 is an enlarged side elevation of one of the spring loaded cart pushing dogs used to advance the carts past the upstream gates of the pressure locks, certain parts being cut away.

FIG. 7 is a section looking in the direction of arrows 7—7 of FIG. 6.

FIG. 8 is an elevation similar to FIG. 6 but illustrating a shorter cart pushing dog used to advance the carts while in the cooking chamber.

FIG. 9 is a perspective of one form of a non-agitating cart having a tunnel adapted to process containers when horizontally disposed therein, and further illustrating the direction of movement of the cart through the vessel and the heat treatment liquid through the tunnel, certain parts being cut away.

FIG. 10 is a transverse section taken through another form of non-agitating cart adapted for handling vertically disposed containers.

FIG. 11 is a diagrammatic plan of a cooker and cooler of the type illustrated in FIG. 1 except that the pressure vessel includes two sections angled relative to each other.

FIG. 12 is a transverse section through the pressure vessel and one form of an agitating cart adapted to handle horizontally disposed containers, the section being taken substantially along the lines 12—12 of FIG. 13.

FIG. 13 is a vertical central section of the cart illustrated in FIG. 12 taken along lines 13—13 of FIG. 12.

FIG. 14 is a transverse section similar to FIG. 12 but adapted to handle vertically disposed containers, the section being taken substantially along the lines 14—14 of FIG. 15.

FIG. 15 is a vertical central section of the cart illustrated in FIG. 14 taken along lines 15—15 of FIG. 14.

FIG. 16 is an end elevation of the type of cart illustrated in FIG. 15 but illustrating a different type of agitating mechanism, the elevation being taken looking in the direction of arrows 16—16 of FIG. 17.

FIG. 17 is a vertical central section of the cart illustrated in FIG. 16 taken along lines 17—17 of FIG. 16.

FIG. 18 is a diagrammatic vertical central section of a second embodiment of the invention illustrating a continuous pressure vessel similar to the first embodiment but including a third pressure lock to positively separate the vessel into a cooking chamber and a cooling chamber.

FIG. 19 is a diagrammatic vertical central section of a third embodiment of the continuous pressure vessel but including a plurality of baffles for separating a cooking chamber from a cooling chamber.

FIG. 20 is a chart illustrating the positions of the several components of the continuous pressure cooker and cooler during a six minute cycle of operation.

FIG. 21 is a diagrammatic view of the hydraulic and electrical circuits which control the operation of the several components of the cooker and cooler.

DESCRIPTION OF THE PREFERRED EMBODIMENT

The first embodiment of the continuous pressure cooker and cooler 20 (FIGS. 1-8) in general comprises an elongated horizontally disposed pressure vessel 22 having an inlet pressure lock 24 and an outlet pressure lock 26. A plurality of processing vessels or carts 28 filled with containers C (FIG. 9) to be processed are moved into alignment with the pressure vessel 22 on a roller feed conveyor 30 (FIG. 3). A hydraulic system 32 (FIG. 21) is then activated to operate cart drive means and gates of the pressure locks 24 and 26 (FIG. 1) to first move the carts 28 one by one into and through the inlet pressure lock 24, through a cooking chamber 34 within the pressure vessel 22, and through outlet pressure lock 26 which serves as a pressure mini-cooler or pre-cooler 36. After discharge into the atmosphere from the outlet pressure lock 26, the carts 28 are received on a driven roller conveyor 38 for further cooling by atmospheric cooler 40 and ultimate discharge from the continuous pressure cooker and cooler 20 of the present invention.

During cooking, water is directed into each cart 28 through outlet pipe 41 of a water supply and circulation system 42 (FIG. 2A) for controlled flow from one end to the other of a container filled tunnel 44 (FIG. 9) in each cart 28. The water then overflows from the cart into a shallow pool in the bottom of the vessel below the carts 28 (FIGS. 2A and 2B) for reheating by a steam heating system 46 and recirculation through the tunnel of each cart. The heating system 46 may include steam pipes 46' for heating the water which overflows from the carts 28 into the bottom of the vessel, may comprise steam injector 46" (FIGS. 3 and 4) connected to the inlet pipes of the water system 42, or may be a combination of both.

An overriding air pressure from a high pressure air system 48 is directed into the cooking chamber 34 and pressure locks 24,26, by conventional means (not shown). After pressure pre-cooking as well as after pressure pre-cooling in the pressure locks 24,26 has terminated, the locks 24,26 are vented through valved conduits. Conventional control means (not shown) is provided to control the pressurizing and venting of the locks. During cooling, cool water is received from the water system 42 and is circulated through the tunnels until the steam in the containers is condensed permitting the outlet lock 26 to be vented to atmosphere through valved conduit 52. With most products, condensation occurs within one minute. The outlet lock 26 is then opened, and thereafter cooling of the containers is continued by the atmospheric cooler 40 at which time cooling water is directed through the tunnels 44 in the carts until the contents of the container C are cooled to below the boiling point of water at atmospheric pressure.

More particularly, the first embodiment of the continuous pressure cooker and cooler 20 (FIGS. 2A, and 3) comprises a roller feed conveyor 30 upon which pre-loaded container filled carts 28 are placed by a fork lift truck or the like. The feed conveyor 30 and pressure vessel 22 are mounted on a frame F with the conveyor 30 being disposed at 90° to the longitudinal axis of the pressure vessel 22. The conveyor 30 is a free roller conveyor and includes a plurality of rollers 60 secured to shafts 62 journaled on the frame F. The rollers 60 engage the bottom wall 64 (FIG. 2A) of the carts 28 between cart wheels 66. The rollers are of sufficient diameter to support the carts at a height that permits the cart wheel 66 to clear the roller shafts 62. The carts are pushed transversely of the pressure vessel 22 until the wheels 66 become aligned with tracks 68,70 that extend through the pressure vessel 22. A hydraulic inlet lock feed ram 72 of the hydraulic system 32 is mounted on the frame F in position to push each cart 28 off the feed conveyor 30 and into the inlet pressure lock 24 when piston rod 74 of ram 72 is extended. As indicated in FIG. 2A and 2B, wheel centering corrugated abutments 76 are provided along the tracks 68,70 to hold the cart 28 in desired position after step-by-step advancement of the carts through the pressure vessel 22.

The inlet pressure lock 24 comprises an inlet gate valve 78 and an outlet gate valve 80 one of which is always closed during high pressure operation of the cooking and cooling apparatus 20 to prevent loss of pressure from the cooking chamber 34. As best illustrated in FIGS. 2A and 4, the input gate valve 78 comprises a vertically movable gate 82 which is slidably received in an annular wall 84 welded in fluid tight engagement to the inside of a cylinder 86 that defines a part of the pressure vessel 22. The wall 84 includes a large rectangular opening 88' of sufficient size to allow the carts 28 to move therepast. The wall 84 is also provided with a slot in its upper portion and grooves in the inner surfaces of the other portions to receive the gate 82 and seal the gate in pressure tight relationship to the wall 84 when closed. The gate 82 is moved between its open and closed positions by an inlet lock hydraulic ram 90 that has its piston 92 connected to the gate 82 and its cylinder 94 secured to the upper end of a pressure tight gate receiving housing 96 that is sealed in fluid tight engagement to the outer surface of the cylinder 86.

The outlet gate valve 80 is substantially the same as the inlet gate valve 78 and accordingly will not be described in detail. The gate valve 80 includes a piston rod 100 of a hydraulic ram 102 that is connected to a gate 104 for opening and closing the outlet gate valve 80 in timed relation with the movement of the inlet gate valve 78.

The outlet pressure lock 26 (FIG. 2B) is similar to the inlet pressure lock 24 in that it includes an inlet gate valve 106 and an outlet gate valve 108 that are substantially the same as the gate valves 78 and 80. The inlet gate valve 106 is actuated by a hydraulic ram 110 while the outlet gate valve is actuated by a hydraulic ram 112 in such a way that one of the valves is always closed during normal operation of the continuous pressure cooker and cooler 20.

In order to advance the carts 28 from the inlet pressure lock 24, through the cooking chamber 34, and into the outlet pressure lock 26, an intermittently driven hydraulically operated conveying system 116 is provided. The conveying system 116 includes a hydraulic ram 118 (FIG. 2A) of the hydraulic system 32 that has its cylinder 120 secured to the frame F and its piston 112 secured to an elongated push rod 124 that extends substantially the full length of a pressure vessel 22. The rod is slidably received in the lower portion of each of the several walls that define portions of the gate valve 78,80,106 and 108.

As indicated in FIGS. 2A, 6 and 7, a long fingered pusher dog 126 is mounted to the rod 124 within the inlet pressure lock 24 by a split block clamp 127. A pusher finger 128 is pivotally connected to the clamp 126 and is urged upwardly by a spring 129 thus permitting the finger 128 to move downwardly under the cart 28 when the piston 122 is being retracted. When the piston is fully retracted as indicated in FIG. 2A, the finger 128 is resiliently urged into its illustrated position for engagement with the trailing wall of an associated cart 28 to move the cart from within the inlet pressure lock 24 past the gate valve 80 and into the pressure cooking chamber 34 upon full extension of the piston 122 and its rod 124.

A similar long fingered pusher dog 126' (FIG. 2B) is clamped near the outlet pressure lock 26 and serves to move the last cart 28 in the cooking chamber 34 into the outlet pressure lock 26 upon full extension of the piston 122 and rod 124.

In addition to the long fingered pusher dogs 126 and 126', a plurality of evenly spaced short fingered dogs 126" (FIGS. 2A and 8) are clamped at even intervals along the push rod 124 and serve to advance the carts step-by-step within the cooking chamber 34 toward the outlet pressure lock 26 upon reciprocation of the push rod 124.

In order to withdraw the carts 28 from the outlet pressure lock 26 (FIG. 2B), a separate outlet lock conveying system hydraulic ram 130 is provided with its cylinder 132 secured to the frame F and its piston rod 134 secured to a large diameter tube 136 having a spring loaded finger 126''' clamped thereon by a split block 138. The tube 136 is slidably received on a smaller diameter tube 140 which in turn slidably receives and guides the end portion of the rod 124. The small diameter tube 140 is rigidly secured to the lower portion of the rigid wall of gate 106 and extends into the lower portion of the rigid wall of gate 108 to prevent leakage of high pressure fluid therepast when the outlet gate 108 is closed. A port 142 is formed in the tube 136 in order to allow fluid within the small diameter tube 140 to freely escape when the rod 124 is moved to the right (FIG. 2B).

As the ram 130 withdraws each cart 28 from the outlet pressure block 26, the bottom wall 64 of the cart becomes supported by the driven roller conveyor 38 (FIGS. 2B and 5) of the atmospheric cooler 40. The conveyor 38 comprises a plurality of rollers 146 mounted on shafts 148 journaled on the frame F. As illustrated in FIG. 5, the rollers are shorter than the span between the wheel 66 of the several carts 28 and are of sufficient diameter to support carts with the wheels spaced above the shafts 148. All of the shafts 148 have sprockets 150 keyed thereto, which sprockets are interconnected by an endless chain 152 that rides in a track 154 secured to the frame F. A gear motor 156 is coupled to one end of one of the shafts 148 thereby driving all rollers 146 in a clockwise direction (FIG. 2B) causing the carts 28 to move through the atmospheric cooler and then be discharged from the continuous cooker and cooler 20 of the present invention.

Having reference to FIGS. 2A and 2B, the water supply and circulation system 42 comprises a driven pump P which receives hot overflow water from the bottom of the pressure vessel 22 through conduit 158. The pump P also receives make-up water from a valved conduit 159. A check valve CK in the conduit 158 permits water to flow only toward the right in FIG. 1. The pump P directs the heated water into the carts 28 through valved outlet ports 41 that are connected to the outlet of the pump by conduits 160, only a fragment being shown. As indicated in FIGS. 2A and 2B, the water is heated by steam directed into the overflow water in the bottom of the pressure vessel 22 by steam pipes 46'. It is recognized that more heat will be transferred between the containers and the hot water near the inlet end of the cooking chamber 34 and accordingly, the outlet ports 41 of the water supply system 42 near the inlet end of the cooking chamber are valved so that they discharge a larger volume of water into the associated carts 28 than do the ports 41 in the cooking chamber 34 near the outlet pressure lock 26. Also, as previously mentioned, steam injectors 46'' (FIGS. 3 and 4) may be used on all ports 41, if desired, to additionally heat the water entering the carts 28.

As indicated in FIGS. 2B and 5, a plurality of pumps P2, P3 and P4 are provided in the atmospheric cooler 40 and each pump receives overflow water from the cart thereabove and directs the cooling water through conduits 161 for discharge into the next upstream cart 28 thereby gradually cooling the containers. The water received from the cart immediately downstream of the outlet lock 26 is mixed with cold make-up water from valved conduit 162, and the mixed cooling water is then directed into the cart in the outlet lock 26 to precool the containers when under pressure thereby condensing the steam therein and preventing bursting of the containers when they are returned to atmospheric pressure.

The water overflowing from the container in the outlet lock 26 is at a relatively high temperature and is pumped through conduit 163 into the port 41 in the inlet lock 24 (FIG. 2A) by pump P5 (FIG. 2B). In this way the cool containers entering the pressure vessel are not subjected to severe thermal shock and are gradually raised to cooking temperature.

The continuous pressure cooker and cooler 20 as above described and as illustrated in FIGS. 1, 2A and 2B is an inline cooker and cooler. It will be understood, however, that the path of movement of the carts 28 need not be linear but that the vessel may include portions angled relative to each other so as to require less floor space and to fit within corners of buildings, for example.

FIG. 11 diagrammatically illustrates such an angled continuous pressure cooker and cooler 20' having its pressure vessel 22' divided into two parts disposed at right angles to each other. The components of the cooker and cooler 20' are substantially the same as that disclosed in the FIG. 1–8 embodiment except that the wheels of the cart 28' should be of the castor type and two hydraulic conveying systems 116' are required for moving the carts through the two pressure vessel sections.

The cart 28 illustrated in FIGS. 2A, 2B, 5 and 9 is a "still cook" or non-agitating cart which is somewhat similar to one of the carts illustrated in my aforementioned copending application Ser. No. 751,923 but is oriented with the tunnel 44 disposed at 90° to the direction of movement of the cart 28 through the vessel 22.

The cart 28 comprises an open top, generally rectangular water tight housing or tub 170 having a bottom wall 172 and four vertical walls 174, 176, 178 and 180 connected in fluid tight relationship. The wall 180 and adjacent portions of the walls 176 and 178 cooperate with a plate 182 to define a short water inlet housing 184. The water inlet housing or flow control means 184 defines a hydrostatic water inlet leg or head of sufficient height above the upper edges of the walls 176, 178 and 174 to completely submerge all containers C and to provide a predetermined controlled flow of water from the inlet housing, through the tunnel 44, and over the upper edge of the overflow wall 174.

Four vertically extending angle guide posts 185 are welded to the walls of the tub 170 and serve to guide a plurality of nesting container filled trays 186 into stacked relation within the tub. Each tray includes an imperforate bottom wall 188, a pair of perforated end walls 190, 192 and a pair of imperforate side walls 202, 204. In order to prevent flotation of the containers C, a hold down plate 206 is disposed above the containers in at least the upper tray and if desired in each tray 186.

An imperforate cover plate 208 (FIGS. 5 and 9) is disposed above the lower edge 210 of the water inlet housing plate 182 and is fitted over the upper edges of the tub 170 except for a rectangular overflow opening 212 (FIG. 5) near the wall 174. The plate may be held in place either by its own weight or by thumb screws or the like (not shown).

Thus, the tunnel 44 is defined by the bottom wall 172 of the tub 170, the cover plate 208, and the side walls 202, 204 of the trays 186. The configuration of the cart 28 assures that a controlled flow of liquid moves past all containers C in the tunnel 44 since the hydrostatic pressure head created by the water in the inlet housing 184 causes the water to flow through the tunnel 44 and then overflow from the tub 170 for collection in a shallow pool in the bottom of the pressure vessel 22.

If it is desired to still cook containers Ca (FIG. 10) when they are disposed vertically rather than horizontally, a still cook processing vessel or cart 28a is loaded with filled containers Ca and is moved through the continuous cooker and cooler 20 in place of the cart 28.

The cart 28a comprises a tub 230 supported on wheels 232 and defined by four walls 234, 236, 238 and 240 of equal height and welded in fluid tight engagement to a bottom wall 241. A tray holder 242 is disposed within the tub 230 and includes a pair of imperforate side walls 244 and a perforated bottom wall 246 welded to the walls 238 and 240 and in spaced relation to the adjacent walls of the tub 232 define flow passages therebetween.

A pair of container supporting trays 248 are inserted in the tray holder 242, and each tray includes a grille type floor 250 having spaced pairs of vertically extending container confining walls 254, 256 welded to the floor 250 and to peripheral straps 258. The walls 254, 256 define a plurality of container supporting passages 260 with water flow passages 262 therebetween.

A removable water spreading tray (or flow control means) 268 having a perforated floor 270 is inserted in the tray holder 242 above the uppermost tray 248 and above the walls of the tub 230. During processing in the cooker and cooler 20, the heat treatment liquid (water) is directed into the tray 268 from the water supply system 42 from a plurality of outlet ports 41a spaced longitudinally in the pressure vessel 22. Since the surface of the water in the tray 268 is slightly higher than the upper surface of the tub 230, a hydrostatic head is formed causing the water to controllably flow through a tunnel 44a defined by the walls 254, 256 down past the containers Ca and then flow over the upper edges of the tub as indicated by the arrows in FIG. 9.

It is well known in the sterilizing art that certain food products are more effectively cooked if they are agitated during cooking. For example, it is desirable to agitate food products such as raviollies to prevent them from sticking together; macaroni and cheese to prevent them from balling up, and beef stew to provide better heat transfer thereby preventing undercooking of the beef and overcooking of the vegetables.

One type of an agitating processing vessel or cart 28b is disclosed in FIGS. 12 and 13 and is adapted to process containers Cb when positioned in the cart with their longitudinal axes horizontal.

The cart 28b is moved through a continuous cooker and cooler 20b which is substantially the same as the cooker and cooler 20 (FIGS. 2A and 2B) and accordingly equivalent parts will not be described in detail but will be assigned the same numerals followed by the letter "b". The apparatus 20b differs from the apparatus 20 in two respects. First, the water discharge conduits 41b of the water supply system are slightly longer than the equivalent conduits of the first embodiment since they discharge the water near the vertical centerline of the pressure vessel 22b. Secondly, a rotary agitating drive system 278 is provided and includes a pinion gear shaft 280 (FIG. 12) that extends substantially the full length of the pressure vessel 22b and is journaled in the several transverse walls 84b associated with each of the gate valves, only a fragment of the gate valve 106b being illustrated in FIG. 12. Elongated pinion gear sections 282 are keyed to the shaft 280 and each section extends substantially the full distance between the adjacent gate walls 84b. Thus, the portions of the pinion gears disposed within the two pressure locks and the cooking chamber 34b define a continuous pinion gear extending therethrough except for narrow gaps which accommodate the width of the several gate walls 84b in which the shaft 280 is journaled. The teeth of each pinion gear section 282 are aligned with the teeth of all other sections, and the shaft 280 is driven by a variable speed gear motor 284 coupled to the shaft 280.

Each cart 28b comprises a liquid tight open topped tub 288 and a rotary tunnel 289 positioned therein. The tub 288 comprises end walls 290,292 and a generally cylindrical body 294 with upstanding planar side walls 296 defining side portions of the open top of the tub. An inlet baffle 298 having a large diameter opening 300 therein is welded to the cylindrical body 294 and to the side walls 296 adjacent the end wall 290 to define flow control means in the form of an inlet water leg 302. A similar baffle 304 with a large diameter opening 306 therein is welded adjacent the wall 292 to define an overflow water discharge leg 308. Curved baffles 310 and 312 are disposed in the bottom of the legs 302 and 308 to aid in guiding the liquid from the inlet leg 302 through the rotary tunnel 289 and out of the overflow water leg 308. It is to be noted that the upper end of the hydrostatic leg 302 is at a higher elevation than the upper end of the overflow leg and also at a height above all containers within the tunnel thus assuring a continuous flow of liquid in and through the tunnel in a direction indicated by the arrows in FIG. 11.

The rotaty tunnel 289 comprises a pair of spiders 316,318 having spaced legs 320 bolted to three imperforate walls 322 and to an imperforate cover 324 that is removably connected to one of the spiders 316,318 by wing nuts 326. The spiders 316,318 are connected to stub shafts 328,330 journaled in the end walls 290,292 with a spur gear 332 keyed to the shaft 292. The tub 288 is supported by wheels 334 which are guided along tracks 68b,70b during movement of each tub through the pressure vessel 22b with sufficient accuracy to maintain the teeth of the spur gear 332 and pinion sections 282 in meshing engagement at all times during pressure cooking and cooling of the containers. The width of the spur gear 332 is greater than the thickness of the gate valve walls 84b and the corresponding gaps between pinion sections thereby assuring that the gears will be retained in meshing engagement throughout their entire path of movement through the pressure vessel.

A false bottom 335 is provided on the cart 28b between the wheels 334 to support the cart when it is conveyed into and out of the pressure vessel 22b in the manner previously described in regard to the first embodiment of the invention.

As diagrammatically illustrated in FIG. 13, the containers Cb are placed in trays 186b and cooperating hold down plates 206b which are substantially the same as those illustrated in FIG. 9 and described in connection with the carts of the first embodiment of the invention, and accordingly will not be repeated. The container filled trays 186b are loaded into and removed from the tunnel 289 after first removing the wing nuts 326 and cover plate 324.

In order to assure a substantially equal flow of water past all containers Cb in the tunnel 289, including those in the corners of the tunnel during heat treatment, it will be noted that the radius of the openings 300 and 306 in the baffles 298 and 304 are substantially the same radius as the radius of the path of movement of the corners of the tunnel 289 as the tunnel is rotated. To prevent any substantial direct liquid flow from the inlet hydrostatic leg 302 to the overflow leg 308 externally of the tunnel, arcuate shields 336 are secured to each spider 316,318 at both ends of the rotary tunnel 289 and slidably engage the adjacent baffles 298 and 304.

It will be noted that by using a tub having a generally cylindrical body 294, rather than a rectangular body, that the amount of water required in the cart 28b in excess of that being circulated through the tunnel 289 is reduced to a minimum.

A second type of agitating processing vessel or cart 28c is illustrated in FIGS. 14 and 15 and is intended to handle containers Cc with their longitudinal axes disposed vertically. Since each cart 28c is adapted to be processed in a pressure vessel 22c of the type using a rotary drive system 278c as disclosed in FIG. 12, equivalent parts of the pressure vessel will not be described in detail but will be assigned the same numerals followed by the letter "c". Also, since the carts 28c are quite similar to the carts 28b in many respects, only the differences will be described in detail and equivalent parts will be assigned the same numerals followed by the letter c.

The cart 28c comprises a tub 288c having end walls 290c,292c which have upper ends that are somewhat lower than the upper end portions of the baffles 298c,304c and the upper end portions of side walls 296c. A flanged water distribution tray 340 having a perforated bottom wall 342 is removably received in the rectangular aperture defined by the upper ends of the baffles 298c,304c and walls 296c and receive water from the conduit 41c. Thus, the tray defines flow control means in the form of a hydrostatic water inlet leg 344 whereas the space between the baffles 298c,304c and adjacent end walls 290c,292c define overflow water legs 308c. As indicated in FIG. 15, the baffles 298c and 304c terminate above the bottom of the tub 288c and are imperforate except for openings adapted to receive the stub shafts 328c and 330c, and the hubs of the adjacent spiders 316,318c of the rotary tunnel 289c. Thus, all the water must flow downwardly through the rotating tunnel 289c and past all containers Cc therein before entering the overflow water legs 308c.

The rotary tunnel 289c is rotated by engagement between the spur gear 332c and the pinion gear sections 282c, and differs from the rotary tunnel 289b (FIG. 13) in that the walls 322c (FIGS. 14 and 15) and the cover 324c are perforated thus permitting water to flow downward therethrough. A pair of container accommodating trays 346 that are substantially the same as the trays 248 (FIG. 10) and include pairs of spaced vertically extending plates 350 and 352 (FIG. 15) for defining container supporting passages 354 with water flow passages 356 therebetween. After containers Cc have been loaded into the trays 346, the trays are loaded into the rotary tunnel 289c after first removing the cover 324c.

Although the cart 28c has been described in its preferred embodiment as including a water distribution tray 340 and baffles 298c and 304c, it will be understood that a modified form of this cart may be provided by omitting the tray 340 and baffles 298c,304c and relying on rotation of the tunnel 289c for circulating water past the containers.

The rotary drive systems 278 (FIGS. 12 and 13) and 278c (FIGS. 14 and 15) have been illustrated as including elongated pinion gears 282 and 282c that extend longitudinally of the pressure vessels 22b and 22c and engage large spur gears 332 and 332c connected to the rotary tunnels 289 and 289c of the carts 28b and 28c. It will be understood however, that the scope of the invention is broad enough to cover simmlar carts having rotary tunnels equivalent to the tunnels 289 and 289c but having their axes of rotation disposed at 90° to the axis of the pressure vessel 22. Sprockets may be substituted for each spur gear, and may be positioned to engage endless chains provided in the inlet pressure lock, the cooking chamber, and the outlet pressure lock. The chains can be driven by variable speed motors to rotate the tunnels at the desired speed during high pressure processing.

A third type of agitating processing vessel or cart 28d is illustrated in FIGS. 16 and 17 and is adapted to agitate the containers Cd by a rocking motion rather than a rotary motion. The cart 28d is particularly applicable to basting or mixing operations in glass containers wherein it is desirable to agitate the product but minimize contact between the metal container top and the product. The cart 28d is identical to the cart 28c (FIGS. 14 and 15) except that the spur gear 332c is omitted from the cart and the rotary drive system 278c is omitted from the pressure vessel 22d. Instead, a crank arm assembly 370 and an oscillating drive system 372 (FIGS. 16 and 17) are substituted for the spur gear 332c and the rotary drive system 278c, respectively. Thus, only the differences will be described in detail and equivalent parts of the third type of agitating cart 28d will be assigned the same numerals as used in the last described embodiment of the invention followed by the letter "d".

The cart 28d comprises a tub 288d having the tunnel 289d journaled therein by stub shafts 328d and 330d. The crank arm assembly 370 comprises a lever arm 374 keyed to the shaft 328d and having a roller 376 journaled on its outer end. An abutment stop 378 is secured to end wall 290d in position to engage and prevent counterclockwise pivotal movement of the arm below the illustrated horizontal position in FIG. 16.

The oscillating drive system 372 comprises a plurality of pivotally mounted channel track sections 384 (only one track being shown); with one track section 384 being disposed in each of the pressure locks of the pressure vessel 22d, and the other track sections being disposed in the cooking chamber 34d and being equal in number to the number of carts 28d in the cooking chamber 34d. As illustrated in FIG. 17, each track section 384 is slightly longer than the associated cart 28d and has one end pivotally connected to the wall of the pressure vessel by a pivot shaft 386. The other end of each track section 384 is pivotally connected to the piston rod 388 of an associated hydraulic cylinder or ram 390 that is pivotally connected within the pressure vessel 22d. In order to accurately position each cart 28d relative to its associated track section 384, wheel centering corrugated abutments 76d are formed in the cart supporting tracks 68d and 70d. Thus, each cart wheel 66d of each cart 28d will remain centered between its associated corrugated stops 76d during processing, and will move over and become centered in the next group of corrugations upon the previously described step by step advancement of the carts 28d through the pressure vessel 22d toward the discharge end of the pressure vessel. A flaired end portion 394 at the inlet end of each track section 384 permits easy transition of the rollers 376 from one track section to the other.

During processing, any suitable well known hydraulic control means 395 is provided to direct high pressure hydraulic fluid alternately into the opposite ends of the cylinder 390 through conduits 396,398 to oscillate the track sections 384 and the tunnel 289d connected thereto thereby agitating the contents of the containers Cd disposed within the tunnel. The piston 388 may be extended and retracted slowly or rapidly thereby providing means for varying the degree or severity of agitation of the food product within the containers.

The hydraulic control means 395 (FIG. 16), which forms a part of the hydraulic system 32 to be described hereinafter, includes a four-way valve 401 operated by a cam 402 having a lobe 403 which maintains the valve 401 in the illustrated parallel passage position. A variable speed motor (not shown) drives the cam 402 at the desired speed. Main high pressure conduit HP and low pressure conduit LP supply fluid to the system with the fluid flowing through the valve 401 and into the several rams 390 through conduits 396,398 each having speed control valves SC therein. The conduits 396,398 also have branch lines 403,404 therein which extend to the other rams 390 and the oscillating drive system 372. A spring 406 urges the core of the valve 401 downwardly for actuation by the cam 402 while the solenoid 407 is energized to maintain the valve in its illustrated position, while the carts 28d are moved longitudinally within the pressure vessel 22d. The solenoid 407 is operated by a limit switch 408 (FIG. 2A) which is closed when the gate valve 80 is open.

The second embodiment of the continuous pressure cooker and cooler 20' is illustrated in FIG. 18 and is substantially the same as the first embodiment except that three separate pressure locks are provided. A cooking chamber 411 is disposed between an inlet lock 412 and an intermediate lock 413; and a cooling chamber 414 is disposed between the intermediate lock 413 and an outlet lock 415. In other respects the cooker and cooler 20' operates in substantially the same way, and will accommodate all of the types of carts described above in relation to the first embodiment. The operation of this apparatus 20' is suitable for products that are dense or otherwise require longer times to cool sufficiently to reduce their vapor pressure to atmospheric pressure. It will be noted that in the second embodiment of the pressure cooker and cooler 20', cooling with progressively decreasing pressures takes place in the intermediate pressure lock 413, in the cooling chamber 414 and in the outlet pressure lock 415.

The third embodiment of the pressure cooker and cooler 20" (FIG. 19) of the present invention is substantially the same in construction and mode of operation as the embodiment illustrated in FIG. 8 except that a series of baffles 416 are substituted for the intermediate pressure lock of the second embodiment. The baffles 416 permit the carts to pass from a pressure cooking chamber 417 to an elongated pressure cooling chamber 418 while minimizing the flow of steam-air mixture from the cooking chamber 417 to the cooling chamber 418. This embodiment is much less expensive than the cooker 20' of the second embodiment and yet provides for more cooling under pressure than was possible with the cooker and cooler 20 of the first embodiment of the invention.

The hydraulic system 32 (FIG. 21) for controlling the operation of the continuous pressure cooker and cooler 20 comprises a driven hydraulic pump 420 which directs high pressure hydraulic fluid into high pressure conduits HP. The low pressure fluid is returned to a sump 422 through low pressure conduits LP for recirculation by the pump 420. Solenoid operated spring return valves V1-V7 are connected between high pressure conduit HP and low pressure conduit LP, and the hydraulic rams 72, 118, 90, 102, 110, 112 and 130, respectively. Each valve is operated by a solenoid SOL-1-SOL-7, respectively, and is returned to the illustrated position by springs SP1-SP7. Each valve is a four way valve which is shifted from the parallel passage position illustrated in FIG. 21 to a cross-passage position by energization of the associated solenoid.

Any suitable timing mechanism 424 may be used to sequentially operate the solenoids SOL-1-SOL-7. The timing mechanism 424 may be selectively adjusted to complete a cycle of operation within the range of about 2 to 12 minutes, i.e., the carts will move one step forward during a preselected time period within this range during each cycle.

The timing mechanism 424 illustrated in FIG. 21 comprises a clock motor 426 which drives a shaft 430 one revolution during each operating cycle. For convenience of description it will be assumed that the motor 426 is set at six minutes per cycle. Switch actuating discs D1-D7 are rigidly secured to the shaft 430 and have arcuate lobes L1-L7 thereon which when engaged by the switches S1-S7, respectively, energize the solenoids SOL-1-SOL-7, respectively, thereby actuating the associated rams for the desired time period.

The operation of the preferred embodiment of the continuous cooker and cooler 20 will be described with reference primarily to FIGS. 2A,2B, 20 and 21. The operation will relate to handling the non-agitating carts 28 after they have been loaded with containers to be processed, and after a cart 28 has been positioned on the roller feed conveyor 30 along with other carts 28 being positioned as indicated in FIGS. 2A and 2B. The clock motor 426 (FIG. 21), hydraulic pump 420, and discharge conveyor motor 156 are all started, and the clock motor shaft 430 continuously rotates the discs D1-D7 during processing of the containers. Lobe L1 on disc D1 engages and closes switch S1 thereby energizing solenoid SOL-1 shifting valve V1 to the cross-passage position reversing the direction of flow of hydraulic fluid. Hydraulic ram 72 then pushes the cart 28 off the feed conveyor 30 into the inlet pressure lock 24. Shortly thereafter, the lobe L1 is advanced away from the switch S1 allowing spring SP1 to return the valve V1 and ram 72 to their illustrated retracted positions.

The inlet gate 78 of inlet pressure lock 24 is thereafter closed at about 15° when the lobe L3 on cam disc D3 closes switch S3 which energizes solenoid SOL-3 to shift valve V3 to the cross-passage position thus extending the piston rod of ram 90 and closing gate valve 78 of the inlet lock 24. As indicated in FIGS. 20 and 21, the lobe L3 engages the switch S3 and retains the inlet gate 78 closed until the end of the cycle. With gate valves 78 and 80 both closed, the inlet lock 24 is pressurized, and heated water is directed into the carts as previously described.

In a similar manner and at substantially the same time, inlet gate valve 106 of outlet pressure lock 26 is closed by switch S5 engaging cam lobe L5 of disc D5 thus energizing solenoid SOL-5, shifting valve V5 to the cross-passage position and extending the piston of ram 110 closing gate valve 106. Gate valve 106 remains closed for about 300° (about 5 minutes) of a cycle of operation. With both gate valves 106 and 108 of the outlet lock 26 closed, the outlet lock is pressurized and cooling water is directed therein to pre-cool the containers while under pressure for about 4 minutes.

After about 4¼ minutes of the cycle of operation has been completed, outlet pressure lock 26 is reduced to about atmospheric pressure and outlet gate 108 is opened by lobe L6 of cam disc D6 engaging and closing switch S6. Closing switch S6 shifts valve V6 to the cross-passage position thus reversing the flow of hydraulic fluid to the ram 112 and opening outlet gate valve 108 of outlet lock 26.

While the gate valve 108 is open, switch S7 contacts cam lobe L7 of cam disc D7 thereby momentarily shifting valve V7 to the cross-passage position causing the pusher dog 126''' to engage the cart 28 in the outlet pressure lock 26, and upon retraction of the piston of ram 130, to withdraw the cart 28 from the lock and place it on the rollers 146 of the driven roller conveyor 38 of the atmospheric cooler 40. Prior to closing the outlet gate, the lobe L7 moves out of contact with switch S7 thus allowing spring SP7 to return valve V7 to its illustrated position and allows hydraulic ram 130 and pusher dog 126''' to return to their illustrated positions. Shortly thereafter, cam lobe L6 moves away from switch S6 allowing spring SP6 to shift the valve V6 to its illustrated position thereby closing outlet gate 108 of outlet pressure lock 26.

With inlet gate valve 78 of inlet lock 24 closed and outlet gate valve 108 of outlet lock 26 closed, the other two gate valves 80 and 106 are simultaneously opened at about 315°. Outlet gate valve 80 is opened when switch S4 is contacted and closed by lobe L4 and cam disc D4. Closing of the switch S4 energizes solenoid SOL-4 causing valve V4 to shift to the cross-passage position which reverses the direction of movement of hydraulic fluid causing the piston of ram 102 to retract thereby opening gate valve 80. While clock motor 426 rotates the cam discs toward the end of the cycle and while switch S4 is still closed, lobe L5 moves out of contact with switch S5 thus allowing the spring SP5 to return valve V5 to its illustrated parallel passage position thus reversing the flow of hydraulic fluid and opening inlet gate valve 106 of the empty outlet lock 26.

With the gate valves 78 and 108 closed and the gate valves 80 and 106 open pressure is maintained within the two pressure locks 24,26 and the cooking chamber 34 during which time all of the carts 28 in the vessel 22 may be moved one step to the right (FIGS. 2A and 2B). Such movement empties the inlet lock 24 while the outlet lock 26 is loaded with the furthest downstream cart 28.

With gate valve 80 and 106 open, cam lobe L2 of cam disc D2 engages and closes switch S2 which energizes solenoid SOL-2 thereby shifting valve V2 to its cross-passage position. The direction of flow of hydraulic fluid is thereby reversed thus extending the piston of the conveying system ram 118 causing the pusher dogs 126, 126', and 126" to engage and simultaneously move the associated carts 28 one step to the right (FIG. 21). The lobe L2 then moves out of contact with switch S2 allowing the spring SP2 to return the valve V2 to its parallel passage position thereby returning the conveying system and pushing dogs 126,126' and 126" to their initial positions illustrated in FIGS. 2A and 2B.

Shortly thereafter, gate valve 80 closes in response to cam lobe L4 moving out of contact with switch S4. A short period is allowed for venting inlet lock 24 before gate 78 is opened in response to cam lobe L3 moving out of contact with switch S3. The cam discs have then completed their cycle of operation by rotating 360°. Thereafter, the above cycle of operation is repeated for each and every cart passing through the continuous pressure cooker and cooler 20 of the present invention.

It will be noted from FIG. 20, that the illustrated 6 minute cycle provides a pressure pre-heating time in inlet lock 24 of about 5 minutes; a pressure cooking time in a cooking chamber 34 which accommodates only one cart of about 5 minutes, with 6 minutes of cooking time for each additional cart in larger cooking chambers 34; and a pressure pre-cooling time in the outlet lock 26 of about 4¼ minutes. If a 2 minute or a 12 minute cycle of operation is desired, the clock motor 426 may be set for a two minute or a 12 minute cycle, respectively.

The operation of the continuous cooker and cooler 20 when handling the carts 28a (FIG. 10), 28b (FIGS. 12 and 13), 28c (FIGS. 14 and 15), and 28d (FIGS. 16 and 17) is substantially the same as that described above, with certain additional operations being performed on the agitating carts 28b, 28c and 28d.

When processing agitating carts 28b (FIG. 12), as well as the carts 28c (FIG. 14), the intermittent advancement process is the same as that described above. During high pressure processing within the inlet lock 24, the cooling chamber 34b, and the outlet lock 26, motor 284 of the rotary agitating drive system 278 is energized to drive the elongated pinion gear 282 and thus continuously rotate the spur gear and rotary tunnel 289 of each cart 28b. The tunnels in the carts may be rotated within the range of 1-18 revolutions per minute with the rates varying depending upon the many different types of products being cooked. Products such as ravioli, macaroni and cheese, beef stew and soups or the like require different rates of rotation for most effective cooking and cooling. These products may be cooked at temperatures within the range of about 240° F. and 270° F. with an average cook temperature of about 250° F.

The carts 28d (FIGS. 16 and 17) are moved through the cooker and cooler 20d in the same manner described in connection with the other embodiments of the invention. The tunnels 289d of the carts 28d are not agitated while the carts are moving longitudinally through the pressure vessel 22d at which time the piston rods 388 of the rams 390 are in their illustrated retracted positions. However, between intermittent movements of the carts 289, the tunnel 289d of each cart is oscillated by repeatedly extending and retracting the piston rods 288 of the several rams 390. The tunnels 289d of the carts are oscillated by the previously described hydraulic control means 395 (FIG. 16) between the rate of about 1 to 30 cycles per minute with the low cycles being used for basting, and the high cycles being used for severe agitation.

If container C of the half steam tray type are to be processed by the apparatus of the present invention at production speeds of about 25–30 containers per minute, a cooking time of about 70 minutes at 250° F. and a cooling time of about 30 minutes would be required. With the machine operating in six minute cycles, it would be necessary to provide a pressure vessel that would accommodate 12 carts in the cooking chamber 34 and about 6 carts in the atmospheric cooler.

Cooking pressure, temperatures and holding times in the continuous cooker and cooler of the present invention will vary considerably because of the many types of products that may be processed, and also, because of the many types of containers within which the products may be packaged.

From the foregoing description it is apparent that the continuous pressure cooker and cooler of the present invention advances food filled containers in carts intermittently through a pressure vessel. The carts pass through at least an inlet pressure lock, a cooking chamber, and an outlet pressure lock which serves as a pressure cooler, before passing into an atmospheric cooler. As the carts pass through the pressure vessel, water at the proper temperature flows from one end to the other past the container in the tunnel in each cart thereby first cooking the product within the containers and thereafter cooling the product. The temperature and flow of water passing through the tunnels are controlled to subject each container to the same amount of water thereby rapidly transferring the same amount of heat between each container and the water. The water thereafter overflows into a shallow pool in the bottom of the pressure vessel and is collected and recirculated with the cooking water being reheated before recirculation through the tunnels. The outlet pressure lock of the pressure vessel acts as the sole pressure cooling area in one embodiment of the invention, whereas other embodiments of the pressure vessel includes an outlet pressure lock and also an additional pressure cooling chambers within the vessel. The carts may be either the agitating or non-agitating types.

Although the best mode contemplated for carrying out the present invention have been herein shown and described, it will be apparent that modification and variation may be made without departing from what is regarded to be the subject matter of the invention.

I claim:

1. A continuous method of cooking and cooling product filled containers as they are moved through a pressure vessel comprising the steps of: positioning groups of containers within liquid tight processing vessels having open overflow edges near their upper ends; directing high pressure air into said pressure vessel for maintaining the vessel under superatmospheric pressure; filling the processing vessels to overflowing with a heat treatment liquid for completely submerging all containers in the processing vessel; moving the filled processing vessels from the outer atmosphere, through the pressure vessel and back to the outer atmosphere while maintaining said superatmospheric pressure in said pressure vessel; heating a portion of the heat treatment liquid to a cooking temperature of the food in the containers; circulating the heated liquid through said processing vessels at a controlled rate past the associated containers and then causing the heated liquid to overflow from the processing vessels for collection in a low volume pool; reheating and recirculating the heated liquid from the low volume pool through the processing vessels as the processing vessels are advanced through a portion of the pressure vessel and until the product is cooked; maintaining the upper surface of the pool at a level below the containers in the processing vessels; and thereafter circulating a container cooling heat treatment liquid past the associated containers as the processing vessels are advanced through the remaining portion of the pressure vessel and into the outer atmosphere.

2. A method according to claim 1 including the additional steps of creating an inlet air lock and an outlet air lock at opposite ends of said pressure vessel, maintaining the air locks at superatmospheric pressure when the locks are closed to the atmosphere, alternately opening the air locks to the atmosphere and to the superatmospheric pressure within the pressure vessel, moving a processing vessel into the inlet air lock and a processing vessel out of the outlet air lock when the locks are open to atmospheric pressure, and moving a processing vessel into the pressure vessel from the inlet lock and out of the pressure vessel into the outlet lock when the air locks are closed to atmospheric pressure.

3. A method according to claims 1 or 2 wherein said cooling liquid continues to circulate past said containers and overflows from said processing vessels after they exit from the pressure vessel to continue cooling the containers at atmospheric pressure.

4. A method according to claims 1 or 2 wherein said pressure vessel is maintained at superatmospheric pressure by an overriding air pressure and at sufficient pressure for preventing detrimental expansion of the containers.

5. A method according to claims 1 or 2 wherein said low volume pool of overflow liquid is collected in the bottom of the pressure vessel below the level of the processing vessels for minimizing the amount of liquid being used during processing.

6. A method according to claim 1 wherein the processing vessels are intermittently advanced through said pressure vessel.

7. A method according to claim 1 and additionally comprising the step of agitating the containers as they are moved through the pressure vessel.

8. A method according to claim 7 wherein agitation of the containers is accomplished by rotating the containers during processing.

9. A method according to claim 7 wherein agitation of the containers is accomplished by oscillating each group of containers within the associated processing vessel.

10. A method according to claims 1 or 7 and additionally comprising the step of establishing a hydrostatic head in each processing vessel above the overflow level of the associated processing vessel for establishing said controlled rate of flow of said liquid during cooking and cooling.

11. A method according to claims 7 or 8 wherein the containers have substantially flat parallel surfaces and are elongated in a direction parallel to said surfaces and are positioned in spaced rows in the associated processing vessels, and additionally performing the agitating step by moving the substantially flat surfaces of the containers in a direction that is substantially parallel to the direction of movement of liquid past the associated containers.

12. A method according to claim 2 wherein the processing vessels while within said outlet lock are subjected to a cooling fluid for a sufficient period to reduce the vapor pressure within said containers prior to opening the outlet lock to atmospheric pressure to a pressure below that which will burst the containers.

* * * * *